United States Patent Office 3,423,146
Patented Jan. 21, 1969

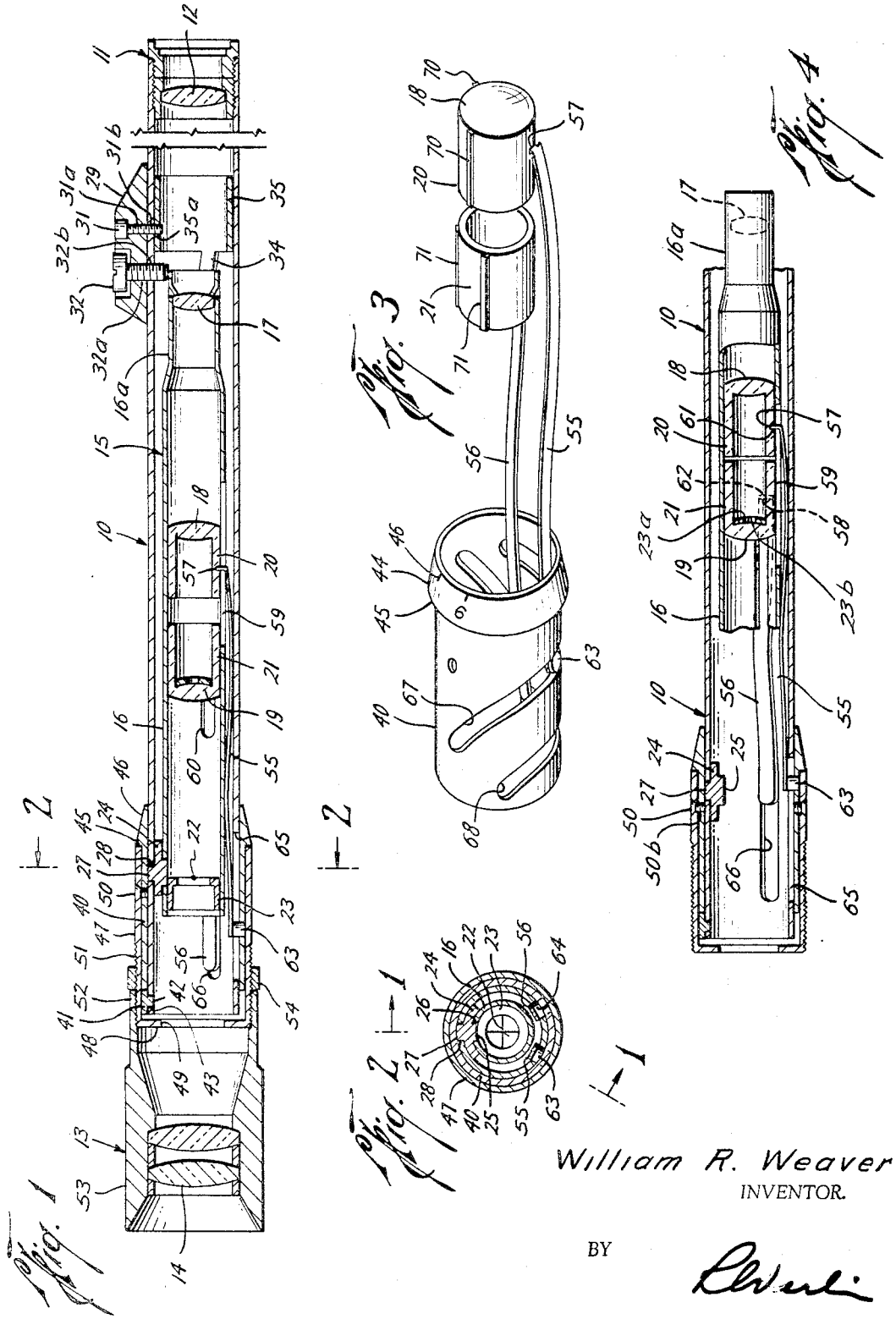

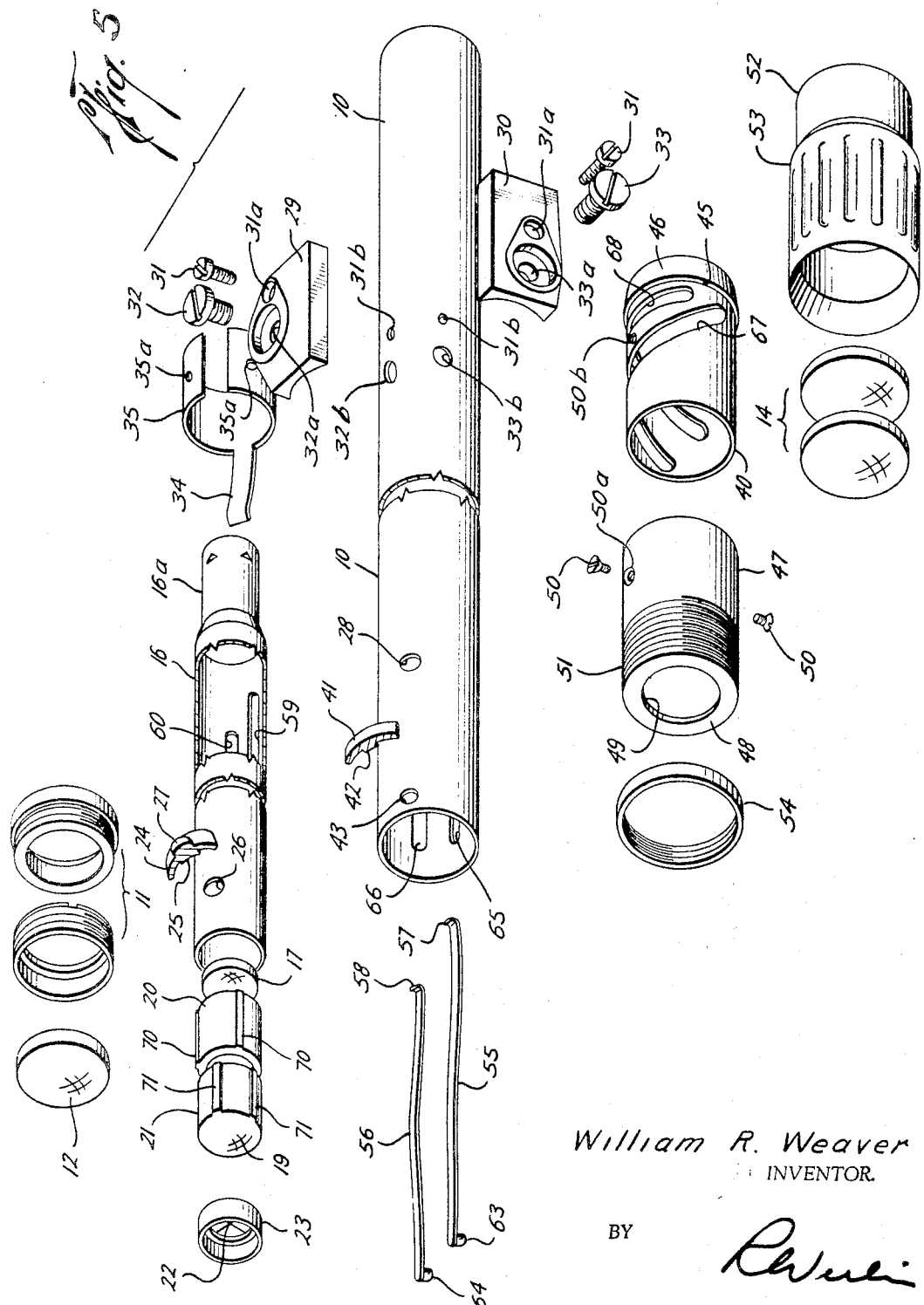

3,423,146
VARIABLE POWER TELESCOPE SIGHT WITH ELONGATED OPTICAL PLASTIC LENSES HAVING GUIDES THEREON
William R. Weaver, El Paso, Tex., assignor to W. R. Weaver Company, El Paso, Tex., a corporation of Texas
Filed Mar. 8, 1965, Ser. No. 437,932
U.S. Cl. 350—44          13 Claims
Int. Cl. G02b 7/04

ABSTRACT OF THE DISCLOSURE

A power adjustable erector system with collar stop which includes a lens support and erector lenses of optical plastic material having guide runners thereon and coaxially slidable therewith. Each erector lens operates with a separate radial lens biasing toggle means operated by helicoidal cam surface in the collar rotatable on a barrel.

This invention relates to improvements in variable power telescope sights for firearms.

In variable power scopes, means are conventionally employed for axially adjusting the relative positions of the erector lens elements relative to a field or collector lens and to each other in order to change the magnification of the telescope to increase or decrease its power as may be desired, usually within limits as determined by the range of variation desired.

Since variable power scopes necessarily involve the employment of a number of moving parts in effecting the adjustments, numerous opportunities occur in more conventional designs for lost-motion, looseness or maladjustment, which will disturb the sighted image relative to the sighting mark or reticle and change the adjustment of the parts, particularly by reason of handling and recoil of the firearm during use. Changes in the power of the scope frequently must be made in the field rapidly and with positiveness in effecting the change while maintaining the scope in focus throughout the changes and under conditions of use.

It is a principal object of this invention to provide a variable power scope which is smooth-operating, has excellent optical qualities and is relatively simple in construction in requiring a reduced number of moving parts and thereby minimizing the opportunities for mis-alignment of parts and resulting disturbance in the optical properties of the scope.

An important object is to provide an improved means for varying the power of the scope while maintaining the scope in focus throughout its range of adjustment under field handling conditions and under recoil of the firearm.

In more conventional variable power scopes the erector lenses, which must move axially relative to each other and to the field lens, are ordinarily mounted in separate cylindrical housings or cells which usually are telescopically connected. Co-operating helicoidal slots or cams and co-operating pins or cam followers on the respective cells are employed to effect the desired relative axial movement of the lenses in response to a rotary drive means mounted on the scope.

An important object of the present invention is to reduce the number of parts required to effect the lens movements while maintaining the lens supports or housings in snug, smooth operation relative to each other and to the field lens.

A more specific object is to provide a power adjusting sub-assembly comprising a power adjusting collar carrying both lens-adjusting slots and connected to the respective erector lenses by actuating bars which move both lenses simultaneously in response to the rotation of the single actuating collar.

A more specific object is to provide a power adjusting sub-assembly in which the actuating bars function as resilient thrust means for the lens housings in a manner to effectively prevent lateral movement of the lenses, which might otherwise produce a disturbance in the target image relative to the sighting mark or reticle.

Still another object is the provision of a pair of erector lenses which are integrally formed with their supporting housings or cells from suitable optical plastic material, thereby further reducing the number of parts required and eliminating additional sources of possible disturbance of the important elements of the scope.

Other and more specific objects and advantages of this invention will become more readily apparent from the following detailed description when read in conjunction with the accompanying drawing which illustrates a useful embodiment in accordance with this invention.

In the drawing:

FIG. 1 is a longitudinal cross-sectional view of the scope in accordance with this invention, the section being taken generally along line 1—1 of FIG. 2;

FIG. 2 is a cross-sectional view taken along line 2—2 of FIG. 1;

FIG. 3 is a perspective view of the power adjusting sub-assembly;

FIG. 4 is a fragmentary view generally similar to FIG. 1, showing another position of the erector lenses; and FIG. 5 is an exploded perspective view of the scope in accordance with this invention showing all the parts thereof.

Referring to the drawing, the scope comprises a tubular casing or barrel 10, a threaded bushing 11 at the forward end of the barrel which houses the objective lens system 12, and an eye-piece or ocular portion, designated generally by the numeral 13, which houses the ocular lens system 14, of generally conventional form. An erector system, designed generally by the numeral 15 is mounted in the bore of barrel 10 and comprises a tubular erector support or housing 16 which may be reduced somewhat in diameter at its forward end portion 16a to provide support in the bore thereof for a field or collector lens 117 of conventional design. Front and rear erector lenses 18 and 19, respectively, are mounted in the opposite ends of cylindrical cells or supports 20 and 21, respectively. As illustrated, cells 20 and 21 and their respective erector lenses 18 and 19 may be integrally formed from a suitable and known optical plastic material, the lens portions 18 and 19 being suitably formed to provide the required shape and optical properties. The erector lens elements are coaxially mounted in the bore of housing 16 in axially spaced relation for coaxial movement therein relative to each other and to field lens 17, the erector lenses being mounted at points intermediate the ends of housing 16. Ease of coaxial movement is provided by a close, slidable fit for the cells and the cells have sufficient length that their optical surfaces are maintained substantially transverse of housing 16. A reticle 22, which may be of any conventional form such as a crosshair mounted in a supporting ring 23, is positioned in the rearward end of housing 16 at the second or rearward image plane of the scope, the center of the reticle being positioned on the optical axis of the scope which extends through the centers of the several lenses mounted in the scope.

If desired, the reticle may be positioned in barrel 10 at the second image plane, as disclosed in my earlier U.S. Patent No. 2,949,816. Also, as disclosed in the latter patent an annular diaphragm 23a having an axial aperture 23b may be mounted in lens cell 21, as shown, or in any other suitable location in housing 16 or barrel 10 to place aperture 23b on the optical axis of the scope, whereby to exclude random or divergent light rays from the ocular and concentrate the light to thereby improve the sharpness of the images viewed through the sight.

The rearward end of housing 16 is mounted for limited pivotal movement both vertically and laterally within barrel 10 by means of a pivot element 24 comprising an arcuate plate adapted to fit snugly between the inner wall of barrel 10 and the outer wall of housing 16, and provided with a downwardly projecting cylindrical pivot pin 25 which is received in an opening 26 in the wall of housing 16, and an upwardly projecting cylindrical pin 27 which extends into an opening 28 provided in the wall of barrel 10, as can best be seen in FIGS. 1, 2, and 4. Other known forms of pivot means may be employed, as for example, a rubber ring or sleeve connecting the erector support to the barrel, a ball-and-socket connection, and the like.

Turret members 29 and 30 are mounted at 90° to each other on the exterior of barrel 10, generally opposite the forward end of reduced portion 16a of the erector housing, the turret members being secured to the barrel by means of screws 31 which extend through holes 31a in the turret members and are screwed into and through openings 31b in barrel 10. Elevation and windage adjusting screws 32 and 33 extend radially through respective openings 32a and 33a in the respective turret members and are screwed through registering openings 32b and 33b in barrel 10 into engagement with the forward end portion 16a of the erector housing. This will be recognized as a generally conventional arrangement, by means of which the forward end of the erector housing may be adjusted vertically or laterally about the pivot member 24 to correct for elevation and windage in sighting-in the scope. A leaf spring 34 integral with a spring metal supporting sleeve 35 is mounted in barrel 10 just forwardly of the forward end of erector portion 16a, and positioned so that leaf spring 34 will bear laterally against forward end portion 16a of erector housing 16 at a point diametrically opposite the center line of the angle between the windage and elevation adjusting screws so as to constantly resiliently urge the forward end of the erector housing against the ends of both the elevational and windage screws to thereby eliminate any looseness or play in this part of the structure under all operating conditions. Supporting sleeve 35 is secured against longitudinal movement in barrel 10 by means of screws 31 which are run through the turret members and the wall of barrel 10 and into openings 35a provided in sleeve 35.

The power adjusting sub-assembly comprises a power adjusting collar 40 rotatably mounted and dimensioned to fit snugly about the rearward end of barrel 10 and held thereon against rearward movement by means of an arcuate retainer plate 41 seated on the rearward end of barrel 10 in abutting relation to the rearward end of collor 40 and provided on its lower face with a pin 42 receivable in a hole 43 formed in the rearward end of barrel 10. The forward end of adjusting collar 40 is provided with an annular flange 44 defining an annular shoulder 45 about the forward end portion of collar 40 and sloping forwardly. The sloping face of flange 44 is provided with suitably spaced calibration marks 46 which are rotated with the adjusting collar relative to an index mark, not shown, on barrel 10 to indicate the power to which the scope has been adjusted.

A tubular shroud 47 is mounted about adjusting collar 40 with its forward end abutting shoulder 45 and its rearward end provided with an inwardly turned flange 48 which extends over the rearward end of barrel 10 having opening 49 therein coaxial with the bore of the barrel. Shroud 47 is fixedly secured to adjusting collar 40 by means of screws 50 extending through openings 50a into openings 50b in collar 40 so that rotation of shroud 47 will correspondingly rotate the adjusting collar. The rearward end portion of shroud 47 is provided with a section of external threads 51 adapted to be threadedly received in an internally threaded socket 52 on the forward end of the ocular housing 53. A lock nut 54 is mounted on threads 51 and when run up against the end of socket 52 of the ocular housing, serves to lock the latter to the shroud. With this arrangement, it will be seen that by turning ocular housing 53, rotation will be imparted to shroud 47 and thence to power-adjusting collar 40 in order to rotate the latter as required to change the power of the scope.

The power-adjusting sub-assembly also includes a pair of toggle links or actuating bars 55 and 56 which extend longitudinally within barrel 10 between power-adjusting collar 40 and the erector lens cells 20 and 21, respectively. The forward ends of the actuating bars are provided with upwardly (inwardly with respect to the axis of the scope) turned lips or flanges 57 and 58, respectively, which project through angularly spaced longitudinal slots 59 and 60 provided through the wall of erector housing 16 into recesses 61 and 62, respectively, in the outer walls of erector cells 20 and 21, respectively. With this arrangement, it will be seen that movement of the actuating bars forwardly or rearwardly will correspondingly move the erector lenses coaxially of the erector housing. The rearward ends of the actuating bars carry radially extending cylindrical pins 63 and 64, respectively, which project outwardly (relative to the scope axis) through longitudinal slots 65 and 66, respectively, in the rearward portion of the wall of barrel 10 and extend therefrom into respective helicoidal cam slots 67 and 68 cut through the wall of adjusting collar 40. The shapes of the individual slots 67, 68 and their relative shapes are cut to provide the desired amounts of relative longitudinal movement between the erector lenses and of the latter relative to the field lens to provide the desired degree of power adjustment. For instance as to alternate cuts and shapes of slots 67 and 68 from that illustrated, these slots may not necessarily be cut all the way through collar 40 or, alternately, the slots may be formed by having the material of collar 40 inwardly raised away from the normal internal collar surface. Relative longitudinal movement of the erector lenses may be effected by having the surfaces of the helicoidal slots at different curvilinear angles with respect to one another. With this arrangement, it will be seen that by providing both cam slots in the adjusting collar, the necessity for separate telescoping sleeves as employed in more conventional designs, is obviated.

Actuating bars 55 and 56 are preferably made of flat spring steel bent in such a manner as to provide spring pressure between barrel 10 and erector housing 16, whereby to obviate any looseness or play in the movements of the erector housing during adjustment of the lenses for power change, for windage or elevation, or by reason of handling or recoil.

It will be understood that the actuating bars may be made straight and other forms of generally conventional, but separate, spring elements employed to provide the necessary pressure between the barrel and the erector housing to maintain the desired tight engagement with pivot plate 24.

To further reduce the possibility of play or looseness during the movement of the power-adjusting elements, erector cells 20 and 21 may be provided with externally projecting pairs of longitudinal ribs spaced from about 90° to about 120° apart on each of the lens cells. In the case of front erector lens 20, these ribs are designated by the numerals 70, 70, and in the case of rear cell 21 by the numerals 71, 71. The lens cells will preferably be oriented angularly to stagger the ribs on the respective cells and the points of engagement of flanges 57 and 58 in the respective cells will be disposed along a line opposite the ribs and bisecting the angle between the ribs on the respective cells. The spring pressure thus applied by the respective actuating bars to the erector cells will assure snug sliding movement of the erector lens cells in housing 16, thereby further minimizing any unwanted play between the erector cells and the erector housing. Ribs 70 and 71 will normally be extremely short, radially, as the cells will ordinarily have been dimensioned to fit quite snugly inside the bore of erector housing 16. The snugness of the fit is enhanced by the runners, however, which also provide bearing surfaces between the cells and the bore of housing 16. It will be understood that instead of having the ribs 70 and 71 on the erector cells, the latter may be made smooth and appropriately spaced ribs provided in the bore of erector housing 16.

In still another variation, the actuating bars and flanges 57–58 may be so formed as to exert a resilient downward pull on the erector lens cells. In such a modification, ribs 70 and 71, if employed, will be positioned on the lower segments of the cells on opposite sides of the respective actuating bars.

In operation of the device, it will be seen that when ocular housing 53 is rotated, the resulting rotation of adjusting collar 40, acting through the engagement of cam followers 63 and 64 with the helicoidal walls of slots 67 and 68, will produce corresponding relative axial movement between erector lenses 18 and 19, moving them toward or away from each other in accordance with the direction of rotation, and simultaneously moving both lenses appropriate axial distances relative to field lens 17, thereby accomplishing the desired degree of increase or decrease in the power of the scope.

Although the illustrative embodiment shows the reticle positioned in the erector tube in the second image plane, it will be understood that the reticle may be mounted in the first image plane. Alternatively, the reticle may be fixedly mounted in the barrel in either image plane. Also, the field or collector lens may be included or omitted, all these variations in more conventional sights being well known in the art of telescope sights.

It will be understood that various other changes and modifications may be made in the details of the illustrative embodiment within the scope of the appended claims but without departing from the spirit of this invention.

What I claim and desire to secure by Letters Patent is:

1. In a variable power telescope sight, comprising:
a tubular barrel, and
longitudinally spaced objective and ocular elements mounted therealong,
an improved power-adjustable erector system including
an erector lens support longitudinally fixedly disposed in the barrel between the objective and ocular elements,
at least one erector lens element coaxially slidably disposed with respect to said support,
means for limiting rotation of said erector lens element operably connected between the barrel and said erector lens element,
a collar rotatably mounted about the barrel,
a helicoidal cam surface in the wall of said collar,
toggle means carrying cam follower means operably connected with said cam surface and with said erector lens element, thereby causing longitudinal positioning of said erector lens element with respect to said objective and ocular elements upon rotation of said collar to vary the magnification of an image viewed through said ocular element,
said toggle means being an elongate bar extending longitudinally in the bore of the barrel and defining a spring element in compression between the barrel and the erector lens element with which it is operably connected, thereby radially biasing the barrel and said erector lens element and obviating lost motion during movement of said erector lens element.

2. In a variable power telescope sight, comprising
a tubular barrel, and
longitudinally spaced objective and ocular elements mounted therealong,
an improved power-adjustable erector system, including an erector lens support longitudinally fixedly disposed in the barrel between the objective and ocular elements,
front and rear longitudinally spaced-apart erector lens elements coaxially slidably disposed with respect to said support,
separate means for limiting rotation of each of said erector lens elements operably connected between the barrel and said erector lens elements,
a collar rotatably mounted about the barrel,
a pair of helicoidal cam surfaces in the wall of said collar,
a pair of elongated toggle means, each carrying a cam follower means operably connected with a separate one of said cam surfaces and with a related one of said erector lens elements, thereby causing relative movement of said erector lens elements with respect to said objective and ocular elements upon rotation of said collar to vary the magnification of an image viewed through said ocular element.

3. A variable power telescope sight as described in claim 2 wherein
the curve of one of said helicoidal cam surfaces is at a greater angle than the curve of the other of said helicoidal cam surfaces, thereby causing the additional relative movement of said erector lens elements with respect to each other upon rotation of said collar.

4. A variable power telescope sight as described in claim 2, wherein
each of said toggle means is an elongate bar extending longitudinally in the bore of the barrel and defines a spring element in compression between the barrel and the erector lens element with which it is operably connected, thereby radially biasing the barrel and said erector lens elements and obviating lost motion during movement of said erector lens elements.

5. A variable power telescope sight as described in claim 2, wherein
each of said bars has an inwardly projecting flange receivable in a recess in the respective erector lens elements, and
wherein
said erector support means is a cylinder and
said separate means for limiting rotation are a pair of longitudinal slots in said erector support means for respectively receiving the projecting flanges of said bars.

6. A variable power telescope sight as described in claim 2, wherein
each of said bars has an inwardly projecting flange receivable in a recess in the respective erector lens elements,
said cam surfaces in said collar are slots,
each of said cam follower means includes an outwardly projecting pin connected to the respective one of said bars, and
said separate means for limiting rotation are a pair of parallel longitudinal slots in each said erector support and the barrel for respectively receiving respective flanges of said bars and respective pins of said bars.

7. A variable power telescope sight as described in claim 2, wherein
said erector lens elements are each an elongate cell of optical plastic material having an integral lens for a transverse surface, said cell being elongate to allow longitudinal movement thereof while maintaining the integral lens substantially transverse of the erector support.

8. A variable power telescope sight as described in claim 2, wherein
said erector lens support is tubular, and
a plurality of longitudinal runners are fixedly attached to one of the outside surfaces of said erector lens elements and the inside bore of said erector lens support for enhancing the snugness of the fit therebetween and to provide bearing surfaces therebetween for easing relative longitudinal movement.

9. A variable power telescope sight as described in claim 2, and including
an externally mounted stop means affixed to said barrel abutting the rear of said collar for limiting the rearward movement thereof.

10. A variable power telescope sight comprising
a tubular barrel member,
longitudinally spaced objective and ocular elements mounted therealong,
an erector support tube operably disposed in said barrel between the objective and ocular elements,
an erector lens assembly disposed within said erector support tube for longitudinal movement with respect thereto,
means operably connected between said barrel and said erector lens assembly for longitudinally moving said erector lens assembly with respect to said objective and ocular elements for varying the magnification of the image viewed through the ocular elements, and
a plurality of longitudinal runners fixedly attached to one of the outside surfaces of said lens assembly and snugly contacting the inside bore of said erector support tube for enhancing the snugness of the fit therebetween and to provide bearing surfaces therebetween for easing relative longitudinal movement.

11. A variable power telescope sight as described in claim 10 wherein
said runners are circumferentially disposed apart from one another by intervals between about 90 degrees and 120 degrees.

12. A variable power telescope sight, comprising
a tubular barrel,
longitudinally spaced objective and ocular elements mounted therealong,
an erector support tube operably disposed in said barrel between the objective and ocular elements,
an erector lens assembly disposed within said erector support tube for longitudinal movement with respect thereto, and
means operably connected between said barrel and said erector lens assembly for longitudinally moving said erector lens assembly with respect to said objective and ocular elements for varying the magnification of the image viewed through the ocular element,
said erector lens assembly including at least one elongated cell of optical plastic material with guide means thereon and having an integral lens for a transverse surface, said cell being elongate to allow longitudinal movement thereof while maintaining the integral lens substantially transverse of the erector support tube.

13. A variable power telescope sight as described in claim 12 wherein
a plurality of longitudinal runners are fixedly attached to one of the outside surfaces of said elongate cell and the inside bore of said erector support tube for enhancing the snugness of the fit therebetween and to provide bearing surfaces therebetween for easing relative longitudinal movement.

References Cited

UNITED STATES PATENTS

| | | | |
|---|---|---|---|
| 737,872 | 9/1903 | Saegmuller | 350—44 X |
| 2,578,130 | 12/1951 | Ford | 33—50.5 |
| 2,610,545 | 9/1952 | Davidson | 350—47 |
| 2,635,289 | 4/1953 | Owens | 350—178 X |
| 2,949,816 | 8/1960 | Weaver | 33—50.5 |
| 3,121,134 | 2/1964 | Heinzel | 350—44 X |
| 3,161,716 | 12/1964 | Burris et al. | 350—44 X |

DAVID SCHONBERG, *Primary Examiner.*

P. R. GILLIAM, *Assistant Examiner.*

U.S. Cl. X.R.

33—50; 350—178, 187